US012291034B2

(12) United States Patent
Kawasaki et al.

(10) Patent No.: US 12,291,034 B2
(45) Date of Patent: May 6, 2025

(54) LIQUID EJECTION APPARATUS AND AGITATION METHOD FOR LIQUID EJECTION APPARATUS

(71) Applicant: SEIKO EPSON CORPORATION, Tokyo (JP)

(72) Inventors: Tomohiro Kawasaki, Shiojiri (JP); Hiromichi Takanashi, Shiojiri (JP)

(73) Assignee: Seiko Epson Corporation, Tokyo (JP)

( * ) Notice: Subject to any disclaimer, the term of this patent is extended or adjusted under 35 U.S.C. 154(b) by 177 days.

(21) Appl. No.: 18/168,022

(22) Filed: Feb. 13, 2023

(65) Prior Publication Data

US 2023/0256740 A1 Aug. 17, 2023

(30) Foreign Application Priority Data

Feb. 14, 2022 (JP) ................................ 2022-020229

(51) Int. Cl.
*B41J 2/165* (2006.01)
*B41J 2/17* (2006.01)

(52) U.S. Cl.
CPC .......... *B41J 2/16505* (2013.01); *B41J 2/165* (2013.01); *B41J 2/16523* (2013.01); *B41J 2/16526* (2013.01); *B41J 2/1707* (2013.01); *B41J 2/1721* (2013.01)

(58) Field of Classification Search
CPC .... B41J 2/16505; B41J 2/165; B41J 2/16523; B41J 2/16526; B41J 2/1707
See application file for complete search history.

(56) References Cited

U.S. PATENT DOCUMENTS

| | | | | |
|---|---|---|---|---|
| 11,845,282 B2 * | 12/2023 | Komatsu | .............. | B41J 2/16508 |
| 2019/0061353 A1 | 2/2019 | Shimizu et al. | | |
| 2022/0040979 A1 | 2/2022 | Takanashi et al. | | |

FOREIGN PATENT DOCUMENTS

| | | |
|---|---|---|
| JP | 2019-038159 A | 3/2019 |
| JP | 2022-030421 A | 2/2022 |

* cited by examiner

*Primary Examiner* — Geoffrey S Mruk
(74) *Attorney, Agent, or Firm* — WORKMAN NYDEGGER

(57) ABSTRACT

The liquid ejection apparatus includes a liquid ejection head, a cap having a closed space forming section forming a closed space, an inflow port through which a humidification fluid flows in, and an outflow port through which the humidification fluid flows out, a humidification fluid storage section storing the humidification fluid, a supply flow path communicating the humidification fluid storage section with the inflow port, a collection flow path communicating the humidification fluid storage section with the outflow port, a pump, a moisture supply section, and a controller. One end of the collection flow path opens at a position in the humidification fluid storage section that is lower than a liquid surface of the humidification fluid. The controller causes the moisture supply section to supply water into the circulation path and drives the pump to cause the humidification fluid to flow in the circulation path.

10 Claims, 5 Drawing Sheets

LIQUID EJECTION APPARATUS AND AGITATION METHOD FOR LIQUID EJECTION APPARATUS

The present application is based on, and claims priority from JP Application Serial Number 2022-020229, filed Feb. 14, 2022, the disclosure of which is hereby incorporated by reference herein in its entirety.

BACKGROUND

1. Technical Field

The present disclosure relates to a liquid ejection apparatus such as an ink jet printer and an agitation method for the liquid ejection apparatus.

2. Related Art

A liquid ejection apparatus, which is an example of the liquid ejection apparatus described in JP-A-2019-38159, includes a cap device. In the cap device, after the cap is brought into contact with the liquid ejection head to form a space surrounding the nozzles, a moisturizing liquid is supplied from a moisturizing liquid storage section, through a connection flow path, and into the space to humidify the nozzles.

In the liquid ejection apparatus as described above, for example, in a case where moisture in the moisturizing liquid in the moisturizing liquid storage section evaporates, it is necessary to supply water into the moisturizing liquid storage section in order to maintain the concentration of the moisturizing liquid. However, when water is supplied to the moisturizing liquid, there is a problem that the moisturizing liquid and the supplied water do not readily mix.

SUMMARY

A liquid ejection apparatus that solves the above problem includes a liquid ejection head configured to eject liquid from a nozzle; a cap including a closed space forming section configured to form a closed space, in which the nozzle opens, by coming into contact with the liquid ejection head, an inflow port through which a humidification fluid for humidifying the closed space flows in, and an outflow port through which the humidification fluid flows out; a humidification fluid storage section configured to store the humidification fluid; a supply flow path configured to bring the humidification fluid storage section and the inflow port into communication; a collection flow path configured to bring the humidification fluid storage section and the outflow port into communication; a pump configured to cause the humidification fluid to flow in a circulation path including the humidification fluid storage section, the supply flow path, and the collection flow path; a water supply section configured to supply water into the circulation path; and a controller, wherein one end of the collection flow path opens at a position in the humidification fluid storage section that is lower than a liquid surface of the humidification fluid in the humidification fluid storage section and, as a first agitation and circulation, the controller supplies water from the water supply section into the circulation path and drives the pump to cause the humidification fluid to flow in the circulation path.

An agitation method for a liquid ejection apparatus, the ejection apparatus including a liquid ejection head configured to eject liquid from a nozzle; a cap including a closed space forming section configured to form a closed space, in which the nozzle opens, by coming into contact with the liquid ejection head, an inflow port through which a humidification fluid for humidifying the closed space flows in, and an outflow port through which the humidification fluid flows out; a humidification fluid storage section configured to store the humidification fluid; a supply flow path configured to bring the humidification fluid storage section and the inflow port into communication; a collection flow path configured to bring the humidification fluid storage section and the outflow port into communication; a pump configured to cause the humidification fluid to flow in a circulation path including the humidification fluid storage section, the supply flow path, and the collection flow path; and a water supply section configured to supply water into the circulation path, the agitation method including opening one end of the collection flow path at a position in the humidification fluid storage section lower than a liquid surface of the humidification fluid in the humidification fluid storage section and performing a first agitation and circulation of supplying water from the water supply section into the circulation path and driving the pump to cause the humidification fluid to flow in the circulation path.

DESCRIPTION OF EMBODIMENTS

Figure 1:
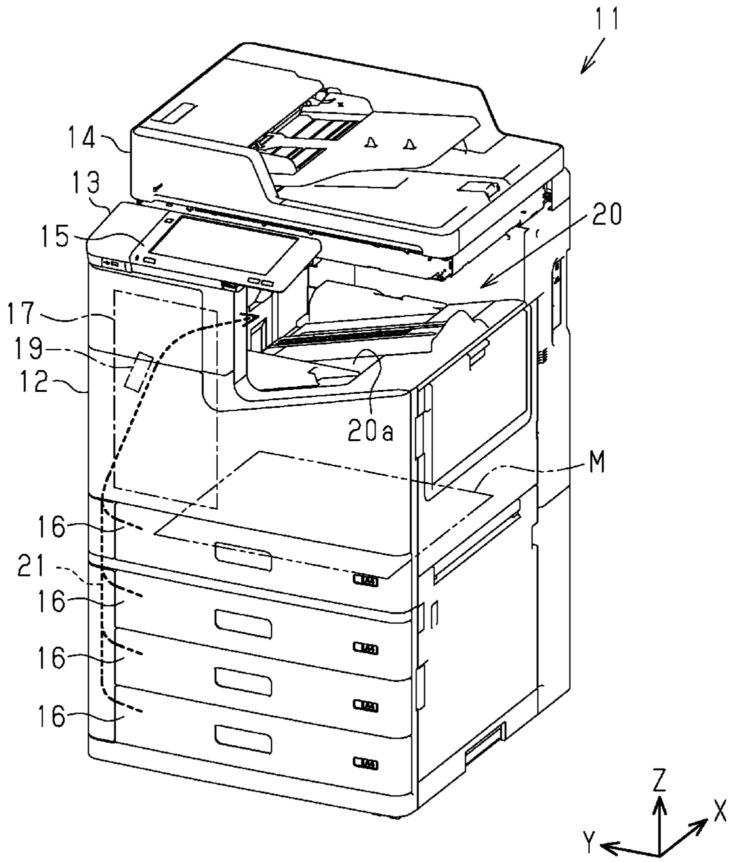
FIG. 1 is a perspective view showing a liquid ejection apparatus according to an embodiment.

Hereinafter, an embodiment of a liquid ejection apparatus and an agitation method thereof will be described with reference to the drawings.

The liquid ejection apparatus is, for example, an ink jet printer that performs printing by ejecting ink, which is an example of a liquid, onto a medium such as a sheet of paper.

In the drawings, it is assumed that the liquid ejection apparatus 11 is placed on a planer surface. The width direction and the depth direction are substantially horizontal. The vertical direction is indicated by the Z-axis, and directions along a plane intersecting the Z-axis are indicated by an X-axis and a Y-axis. The X axis, the Y axis, and the Z axis are preferably orthogonal to each other. In the following description, an X-axis direction is also referred to as a width direction X, a Y-axis direction is also referred to as a depth direction Y, and a Z-axis direction is also referred to as a vertical direction Z.

Liquid Ejection Apparatus 11

Figure 2:
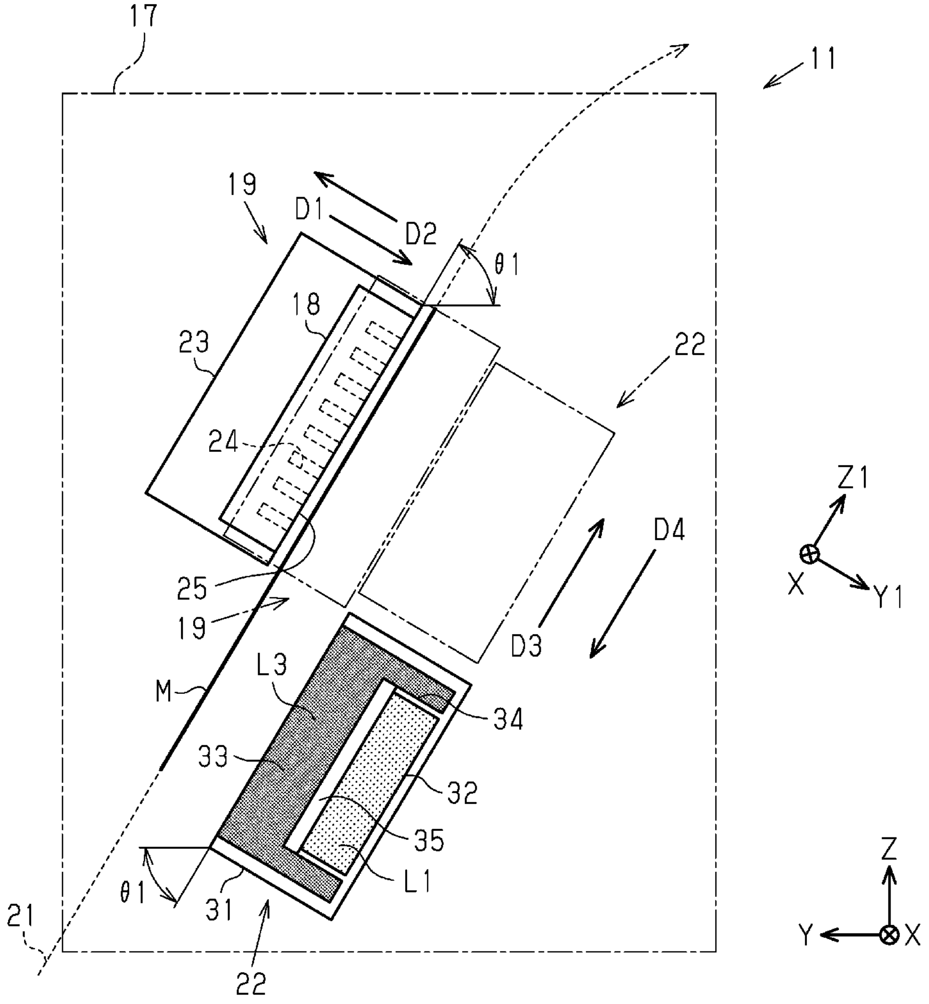
FIG. 2 is a schematic diagram showing an arrangement of components around a liquid ejection head.

As illustrated in FIGS. 1 and 2, the liquid ejection apparatus 11 includes a main body 12 having a rectangular parallelepiped shape, an image reading section 13 attached on the main body 12, and an automatic feeding section 14 attached on the image reading section 13. That is, the liquid ejection apparatus 11 has a structure in which the main body 12, the image reading section 13, and the automatic feeding section 14 are stacked in this order from the lower side in the vertical direction Z.

The image reading section 13 is configured to be capable of reading images such as characters recorded on a document and photographs. The automatic feeding section 14 is configured to be able to feed a set document toward the image reading section 13. The image reading section 13 includes an operation section 15 for operating the liquid ejection apparatus 11. The operation section 15 includes, for example, a touch panel type liquid crystal screen and buttons for operation.

The main body 12 includes a plurality of medium storage sections 16 capable of storing a medium M such as paper. The main body 12 includes one or more medium storage sections 16. The number of medium storage sections 16 included in the main body 12 may be arbitrarily changed. The medium storage section 16 is configured to be pulled out with respect to the main body 12.

The main body 12 includes a printing section 17 that performs printing on the medium M in the main body 12. The printing section 17 includes a head unit 19 having a liquid ejection head 18 capable of ejecting liquid. The main body 12 includes a placement section 20 on which the medium M after printing is placed on an upper section thereof. The placement section 20 has a placement surface 20*a* on which the medium M is placed.

The medium M stored in the medium storage section 16 is transported from the medium storage section 16, along a transport path 21, through the printing section 17, to the placement section 20. When a feed roller (not shown) rotates in a state of being in contact with the uppermost one of the plurality of the medium M stored in the medium storage section 16, the uppermost medium M is sent out from the medium storage section 16 to the printing section 17, which is positioned above the medium storage section 16.

The liquid ejection head 18 ejects ink, which is an example of liquid, toward the medium M when the medium M passes through the printing section 17. The ink ejected from the liquid ejection head 18 adheres to the medium M, whereby printing is performed. The medium M after printing is discharged to the placement section 20 by a discharge roller pair (not shown).

Printing Section 17

As illustrated in FIG. 2, a cap 22 is disposed at a position at the periphery of the liquid ejection head 18, which is provided in the printing section 17, and at a position opposite from the head unit 19 side with respect to the transport path 21. The head unit 19 includes the liquid ejection head 18 and a support section 23 that holds the liquid ejection head 18.

The liquid ejection head 18 is configured to eject liquid onto the medium M from a plurality of nozzles 24, which are in a state of extending in the width direction X and which constitute a plurality of nozzle groups. In the following description, a direction in which liquid is ejected when the liquid ejection head 18 ejects liquid onto the medium M is referred to as an ejection direction Y1. A direction in which the medium M is transported while the liquid ejection head 18 ejects liquid onto the medium M is referred to as a transport direction Z1.

A surface of the liquid ejection head 18 in which the nozzles 24 are opened is a nozzle surface 25. For example, the nozzle surface 25 may not be horizontal. That is, the liquid ejection head 18 is disposed in a posture in which the nozzle surface 25 forms a predetermined angle θ1 with respect to the horizontal plane, for example. For example, the liquid ejection head 18 ejects liquid onto the medium M from the nozzles 24 in a posture in which the nozzle surface 25 forms a predetermined angle θ1 with respect to the horizontal plane. The liquid ejection head 18 may be disposed in a posture in which the nozzle surface 25 is horizontal.

The liquid ejection head 18 is, for example, a line head having a number of nozzles 24 capable of simultaneously ejecting liquid over the entire widthwise region of the medium M in the widthwise direction X, which intersects the transport direction Z1 and the ejection direction Y1. The liquid ejection apparatus 11 performs line printing by ejecting, toward the medium M being transported at a constant speed, liquid from the plurality of nozzles 24 located at positions facing the entire width region of the medium M.

In the liquid ejection apparatus 11, a maintenance operation such as capping, cleaning, or flushing is performed in order to prevent or resolve a liquid ejection failure caused by clogging of the nozzles 24 of the liquid ejection head 18, adhesion of foreign matter to the nozzles 24, or the like. The liquid ejection apparatus 11 includes a maintenance device 26 (refer to FIG. 3) for performing the above-described maintenance operation and the like.

Maintenance Operation

As shown in FIG. 2, capping refers to an operation in which the cap 22 comes into contact with the nozzle surface 25 or the like of the liquid ejection head 18 so as to surround the nozzles 24 while the liquid ejection head 18 does not eject liquid. Since thickening of the liquid in the nozzles 24 is suppressed by capping, the occurrence of ejection failure of the liquid from the nozzles 24 can be prevented.

Cleaning refers to an operation of forcibly discharging liquid from the nozzles 24 by applying pressure at the upstream side of the liquid ejection head 18 or forcibly discharging liquid from the nozzles 24 by applying suction force to the nozzles 24 of the liquid ejection head 18.

Flushing refers to an operation unrelated to printing, of ejecting droplets from the nozzles 24. Flushing discharges thickened ink, air bubbles, foreign matter, and the like, which cause ejection failure, from the nozzles 24, so that clogging of the nozzles 24 can be prevented. Among the liquid discharged from the liquid ejection head 18, liquid that is not used for printing is referred to as waste liquid.

Since the liquid discharged by flushing is not used for printing, it is waste liquid. The waste liquid L3 discharged by flushing is received in, for example, the cap 22. That is, flushing is performed by the liquid ejection head 18 discharging liquid droplets from the nozzles 24 toward, for example, the inside of the cap 22.

The position of the head unit 19 while the liquid ejection head 18 ejects liquid onto the medium M to perform printing on the medium M is referred to as the printing position. The position of the cap 22 while the liquid ejection head 18 ejects liquid onto the medium M to perform printing on the medium M is referred to as the retracted position. The position of the head unit 19 while the liquid ejection apparatus 11 performs a maintenance operation is referred to as the maintenance position. The position of the cap 22 while the liquid ejection apparatus 11 performs a maintenance operation is also referred to as the maintenance position.

The head unit 19 is moved by a head unit movement mechanism 27 (see FIG. 4) between the printing position indicated by solid line in FIG. 2 and the maintenance position indicated by two dot chain line in FIG. 2. A direction in which the head unit 19 moves from the printing position to the maintenance position is referred to as a first direction D1. A direction in which the head unit 19 moves from the maintenance position to the printing position is referred to as a second direction D2.

The cap 22 is moved by a cap movement mechanism 28 (see FIG. 4) between the retracted position indicated by solid line in FIG. 2 and the maintenance position indicated by two dot chain line in FIG. 2. A direction in which the cap 22 moves from the retracted position to the maintenance position is referred to as a third direction D3. A direction in which the cap 22 moves from the maintenance position to the retracted position is referred to as a fourth direction D4.

As shown in FIG. 2, the cap 22 is moved in the third direction D3 from the retracted position indicated by solid line in FIG. 2 to be disposed at the maintenance position indicated by two dot chain line in FIG. 2. Thereafter, the head unit 19 is moved in the first direction D1 from the printing position indicated by solid line in FIG. 2 to be disposed at the maintenance position indicated by two dot chain line in FIG. 2. Thus, the head unit 19 is in a capped state by the cap 22.

In this state, flushing is performed by ejecting droplets from the nozzles 24 of the liquid ejection head 18 toward the inside of the cap 22. Alternatively, in this state, cleaning is performed by pressurizing the liquid in the nozzles 24 of the liquid ejection head 18 to forcibly discharge the liquid droplets from the nozzles 24 of the liquid ejection head 18 toward the inside of the cap 22. That is, in the liquid ejection apparatus 11 of the embodiment, capping, flushing, and cleaning are performed at the maintenance position. Flushing may be performed in a state where the liquid ejection head 18 is separated from the cap 22.

When the maintenance operation such as flushing and cleaning is completed, the head unit 19 is moved in the second direction D2 from the maintenance position indicated by two dot chain line in FIG. 2 to be disposed at the printing position indicated by solid line in FIG. 2. Thereafter, the cap 22 is moved in the fourth direction D4 from the maintenance position indicated by two dot chain line in FIG. 2 to the retracted position indicated by solid line in FIG. 2.

Maintenance Device 26

Figure 3:
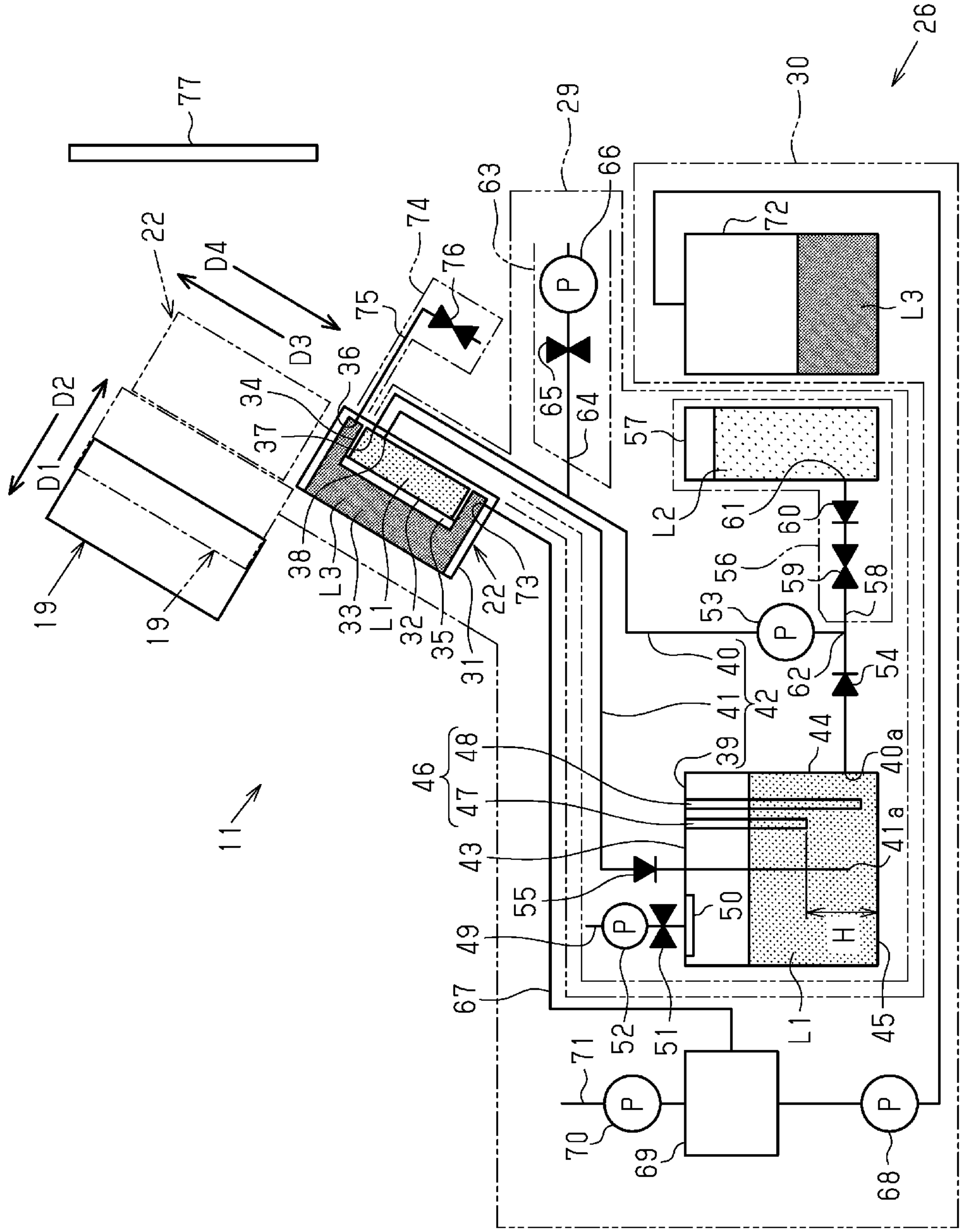
FIG. 3 is a schematic diagram showing configuration of a maintenance device.

As shown in FIGS. 2 and 3, the maintenance device 26 includes the cap 22, the cap movement mechanism 28, a humidification fluid circulation mechanism 29, and a waste liquid collection mechanism 30.

Cap 22

As shown in FIGS. 2 and 3, the cap 22 includes a closed space forming section 31 having a bottomed box shape whose one end side is open. By the end section on the opening side contacting the nozzle surface 25 of the liquid ejection head 18, the closed space forming section 31 forms a closed space into which the nozzles 24 open. A humidification chamber 32 is formed in a central section at the bottom of the closed space forming section 31. The space in the closed space forming section 31 includes a humidification chamber 32 and a waste liquid holding area 33.

The waste liquid holding area 33 is a region other than the humidification chamber 32 in the space inside the closed space forming section 31, and is a region in which waste liquid L3 is stored. An absorber (not shown) capable of absorbing and holding the waste liquid L3 may be disposed in the waste liquid holding area 33. The humidification chamber 32 is isolated from the waste liquid holding area 33 by a partition wall 34 through which liquid does not pass. A portion of the partition wall 34 is constituted by a first moisture permeable membrane 35 having gas permeability. The first moisture permeable membrane 35 allows gas to pass therethrough and inhibits liquid from passing therethrough.

An atmosphere communication hole 36, an inflow port 37, and an outflow port 38 are formed in the closed space forming section 31 and enable communication between inside and outside of the closed space forming section 31. The atmosphere communication hole 36 is disposed in an upper section of the closed space forming section 31 and communicates with the waste liquid holding area 33. The inflow port 37 and the outflow port 38 both communicate with the humidification chamber 32. Humidification fluid L1 flows into the humidification chamber 32 from the inflow port 37. The humidification fluid L1 humidifies the closed space formed by the closed space forming section 31. The humidification fluid L1 contains, for example, glycerin, which is a type of moisturizing agent, moisture, and the like. The concentration of the moisturizing agent in the humidification fluid L1 is set to 22.5 ±5%, for example. The humidification fluid L1 is electrically conductive. The humidification fluid L1 that flowed into the humidification chamber 32 from the inflow port 37 flows out through the outflow port 38.

Humidification Fluid Circulation Mechanism 29

As shown in FIG. 3, the humidification fluid circulation mechanism 29 includes a humidification fluid storage section 39, a supply flow path 40, and a collection flow path 41. The supply flow path 40 brings the humidification fluid storage section 39 and the inflow port 37 into communication with each other. That is, the humidification fluid storage section 39 communicates with the humidification chamber 32 via the supply flow path 40 and the inflow port 37.

The collection flow path 41 brings the humidification fluid storage section 39 and the outflow port 38 into communication with each other. That is, the humidification fluid storage section 39 communicates with the humidification chamber 32 via the collection flow path 41 and the outflow port 38. The humidification fluid circulation mechanism 29 includes a circulation path 42, which includes the humidification fluid storage section 39, the supply flow path 40, and the collection flow path 41.

The humidification fluid storage section 39 has an upper wall 43, a peripheral wall 44, and a bottom wall 45. The humidification fluid storage section 39 stores the humidification fluid L1 therein. The collection flow path 41 penetrates through the upper wall 43 and extends to a lower end portion in the humidification fluid storage section 39. One end 41*a* of the collection flow path 41 opens at a position in the humidification fluid storage section 39 that is lower than the liquid surface of the humidification fluid L1 in the humidification fluid storage section 39. The collection flow path 41 may be configured so as to penetrate through the peripheral wall 44 and have one end 41*a* opened at a position in the humidification fluid storage section 39 that is lower than the liquid surface of the humidification fluid L1 in the humidification fluid storage section 39.

The liquid surface of the humidification fluid L1 in the humidification fluid storage section 39 includes a liquid surface lowered by evaporation of moisture in the humidification fluid L1. One end 40*a* of the supply flow path 40 is connected to a lower end section of the peripheral wall 44. The one end 40*a* of the supply flow path 40 communicates with the inside of the humidification fluid storage section 39.

The humidification fluid storage section 39 includes a detection section 46 that detects the height of the liquid surface of the humidification fluid L1 in the humidification fluid storage section 39. The detection section 46 includes a first electrode 47 and a second electrode 48.

The first electrode 47 and the second electrode 48 extend next to each other straight downward from the upper surface (lower surface of the upper wall 43) in the humidification fluid storage section 39. The length of the first electrode 47 is shorter than the length of the second electrode 48. The height of the lower end of the first electrode 47 from the bottom surface in the humidification fluid storage section 39 is a first height H. The detection section 46 detects the liquid surface of the humidification fluid L1 in the humidification fluid storage section 39 based on whether or not the first electrode 47 and the second electrode 48 are electrically connected to each other.

When the height of the liquid surface of the humidification fluid L1 stored in the humidification fluid storage section 39 is equal to or higher than the first height H, the first electrode 47 and the second electrode 48 will be electrically connected to each other. When the height of the liquid surface of the humidification fluid L1 stored in the humidification fluid storage section 39 is less than the first height H, the first electrode 47 and the second electrode 48 will not be electrically connected.

Therefore, by checking whether or not the first electrode 47 and the second electrode 48 are electrically connected to each other, it is possible to grasp whether the height of the liquid surface of the humidification fluid L1 stored in the humidification fluid storage section 39 is equal to or higher than the first height H or is lower than the first height H. The method for determining whether the height of the liquid surface of the humidification fluid L1 stored in the humidification fluid storage section 39 is equal to or higher than the first height H or is lower than the first height H is not limited to the above-described electrode-based method, and may be an optical method or a capacitive method.

When the height of the liquid surface of the humidification fluid L1 stored in the humidification fluid storage section 39 is equal to or higher than the first height H, the concentration of the moisturizing agent in the humidification fluid L1 can be grasped from the value of the current flowing between the first electrode 47 and the second electrode 48 while a constant voltage is applied between the first electrode 47 and the second electrode 48.

The position of the one end 41*a* of the collection flow path 41 in the humidification fluid storage section 39 may be a position equal to or lower than a height corresponding to the concentration (22.5±5% in this example) of the moisturizing agent in the humidification fluid L1 while the height of the liquid surface of the humidification fluid L1 is the first height H. The position in the humidification fluid storage section 39 of the one end 41*a* of the collection flow path 41 may be a position equal to or lower than the height of the lower end of the second electrode 48 of the detection section 46.

The position in the humidification fluid storage section 39 of the one end 41*a* of the collection flow path 41 may be a position equal to or lower than the height of the connecting section between the one end 40*a* of the supply flow path 40 and the peripheral wall 44 of the humidification fluid storage section 39. The position in the humidification fluid storage section 39 of the one end 41*a* of the collection flow path 41 may be a position equal to or lower than half the height of the highest liquid level of the humidification fluid L1 in the humidification fluid storage section 39.

The humidification fluid storage section 39 has a first atmosphere communication path 49 and a second moisture permeable membrane 50. The first atmosphere communication path 49 brings the inside of the humidification fluid storage section 39 into communication with atmosphere. One end of the first atmosphere communication path 49 is connected to the upper wall 43 of the humidification fluid storage section 39, and the other end is open to atmosphere. The one end of the first atmosphere communication path 49 is in communication with the inside of the humidification fluid storage section 39. The first atmosphere communication path 49 is provided with a first open and close valve 51 and a first pump 52, as an example of a pressure reducing section. The first pump 52 is, for example, a pressure reducing pump.

The first open and close valve 51 is disposed at a position closer to the humidification fluid storage section 39 than is the first pump 52. The first pump 52 applies suction to the inside of the humidification fluid storage section 39 by being driven in a state where the first open and close valve 51 is open. That is, the first pump 52 reduces pressure in the space in the humidification fluid storage section 39 by being driven in a state where the first open and close valve 51 is open.

Instead of the first open and close valve 51 or in addition to the first open and close valve 51, a labyrinth-like thin tube structure may be formed in the first atmosphere communication path 49. A labyrinth-like thin tube structure refers to a tube structure having a thin channel and also a complicated and meandering path to such an extent that air can enter and exit, but movement of liquid in and out is considerably restricted. Due to the labyrinth-like thin tube structure, evaporation of liquid (for example, moisture in the humidification fluid L1) in the humidification fluid storage section 39 is suppressed.

The second moisture permeable membrane 50 is provided at the connection section between the humidification fluid storage section 39 and the first atmosphere communication path 49. The second moisture permeable membrane 50 is provided in the humidification fluid storage section 39 in a state of covering the one end of the first atmosphere communication path 49. The second moisture permeable membrane 50 allows gas to pass therethrough and inhibits liquid from passing therethrough.

As shown in FIG. 3, the humidification fluid circulation mechanism 29 includes a first check valve 54, a pressure regulating valve 55, and a second pump 53 as an example of a pump capable of causing the humidification fluid L1 to flow in the circulation path 42. The second pump 53 causes the humidification fluid L1 to flow in the circulation path 42. By driving the second pump 53, the humidification fluid L1 flowing through the supply flow path 40 is sent to the humidification chamber 32 in the closed space forming section 31 of the cap 22.

The first check valve 54 allows the humidification fluid L1 to flow from the humidification fluid storage section 39 side to the cap 22 side, and prevents the humidification fluid L1 from flowing, due to a water head difference, back from the cap 22 side to the humidification fluid storage section 39 side. An open and close valve may be used instead of the first check valve 54. In this case, the humidification fluid L1 may be caused to flow from the humidification fluid storage section 39 side to the cap 22 side by driving the second pump 53 while the open and close valve is opened.

The pressure regulating valve 55 allows the humidification fluid L1 to flow from the cap 22 side to the humidification fluid storage section 39 side while the humidification fluid storage section 39 side has a predetermined negative pressure, and always prevents the humidification fluid L1 from flowing backward from the humidification fluid storage section 39 side to the cap 22 side. The water head difference is adjusted by the pressure regulating valve 55 so that the humidification fluid L1 does not flow from the cap 22 side to the humidification fluid storage section 39 side due to the water head.

As shown in FIG. 3, the humidification fluid circulation mechanism 29 includes a moisture supply section 56 as a water supply section capable of supplying moisture L2 as water into the circulation path 42. The moisture supply section 56 includes a moisture storage section 57, a moisture supply flow path 58, a second open and close valve 59, and a second check valve 60. The moisture storage section 57 stores moisture L2 that can be supplied into the circulation path 42. The moisture supply flow path 58 communicates with the circulation path 42. The second open and close valve 59 opens and closes the moisture supply flow path 58.

The moisture storage section 57 has an outflow section 61. The moisture storage section 57 communicates with the moisture supply flow path 58 at the outflow section 61. The moisture supply flow path 58 communicates with the circulation path 42 at a first merging section 62 of the circulation path 42. That is, the moisture storage section 57 and the circulation path 42 are in communication with each other. It is desirable that the moisture storage section 57 be configured to be replaceable. The moisture L2 supplied from the moisture storage section 57 into the circulation path 42 is moisture for replenishing moisture that evaporated from the humidification fluid L1. The moisture L2 is composed of, for example, pure water and a small amount of preservative.

When the second open and close valve 59 is opened, the moisture storage section 57 and the circulation path 42 are brought into communication with each other via the moisture supply flow path 58. The second check valve 60 allows the moisture L2 to flow from the moisture storage section 57 side to the circulation path 42 side, and prevents the humidification fluid L1 from flowing back from the circulation path 42 side to the moisture storage section 57 side due to the water head difference. The second check valve 60 may be omitted. In a case where the second check valve 60 is omitted, the second pump 53 may be driven at a timing when the second open and close valve 59 is open, so as to cause the moisture L2 to flow from the moisture storage section 57 side to the cap 22 side.

As shown in FIG. 3, the humidification fluid circulation mechanism 29 includes a pressurized air supply section 63. The pressurized air supply section 63 is configured to supply pressurized air into the circulation path 42. The pressurized air supply section 63 includes a pressurized air supply path 64, a third open and close valve 65, and a third pump 66. The pressurized air supply path 64 is in communication with the circulation path 42. When the third open and close valve 65 is opened, the third pump 66 and the circulation path 42 are brought into communication with each other via the pressurized air supply path 64. The third pump 66 is, for example, a pressure pump. The third pump 66 applies pressure to atmosphere to generate pressurized air, and supplies the pressurized air to the pressurized air supply path 64.

In the circulation path 42, instead of providing the pressurized air supply section 63 downstream of the second pump 53, an atmospheric air supply section may be provided upstream of the second pump 53 and downstream of the first merging section 62. The air supply section may include an atmosphere communication path communicating with atmosphere, and an open and close valve. In this case, the atmosphere may be sent into the circulation path 42 by driving the second pump 53 in a state in which the circulation path 42 is in communication with atmosphere through the atmosphere communication path by opening the open and close valve.

Waste Liquid Collection Mechanism 30

As shown in FIG. 3, the waste liquid collection mechanism 30 includes a waste liquid collection path 67, a fourth pump 68, a buffer chamber 69, a fifth pump 70, a second atmosphere communication path 71, and a waste liquid container 72.

The waste liquid collection path 67 communicates with the waste liquid holding area 33 in the closed space forming section 31 through a discharge hole 73 formed at a lower end section of the closed space forming section 31 of the cap 22. The waste liquid collection path 67 brings the waste liquid holding area 33 into communication with the waste liquid container 72 through the buffer chamber 69. The buffer chamber 69 is provided, for example, at an intermediate position of the waste liquid collection path 67.

When flushing, cleaning, or the like is performed, ink, which is an example of a liquid, is discharged as waste liquid L3 from the nozzles 24 of the liquid ejection head 18 into the closed space forming section 31 of the cap 22. The waste liquid L3 is recovered from the closed space forming section 31 and flows into the waste liquid collection path 67. The waste liquid L3 collected by flushing or cleaning is sent to the waste liquid container 72 by the fourth pump 68. The waste liquid L3 is stored in the waste liquid container 72.

The fifth pump 70 is, for example, a pressure reducing pump. The fifth pump 70 lowers the air pressure in the buffer chamber 69 by discharging air in the buffer chamber 69 to outside the buffer chamber 69 through the second atmosphere communication path 71. By this, the waste liquid L3 discharged at the time of flushing or cleaning, from the nozzles 24 of the liquid ejection head 18 into the closed space forming section 31 of the cap 22, easily flows into the buffer chamber 69 through the waste liquid collection path 67. The buffer chamber 69, the fifth pump 70, and the second atmosphere communication path 71 may be omitted.

As shown in FIG. 3, the cap 22 has an atmosphere opening mechanism 74. The atmosphere opening mechanism 74 includes a third atmosphere communication path 75 and a fourth open and close valve 76. The third atmosphere communication path 75 brings the atmosphere communication hole 36 in the cap 22 into communication with atmosphere. The fourth open and close valve 76 opens and closes the third atmosphere communication path 75. Electrical configuration of liquid ejection apparatus 11

Figure 4:
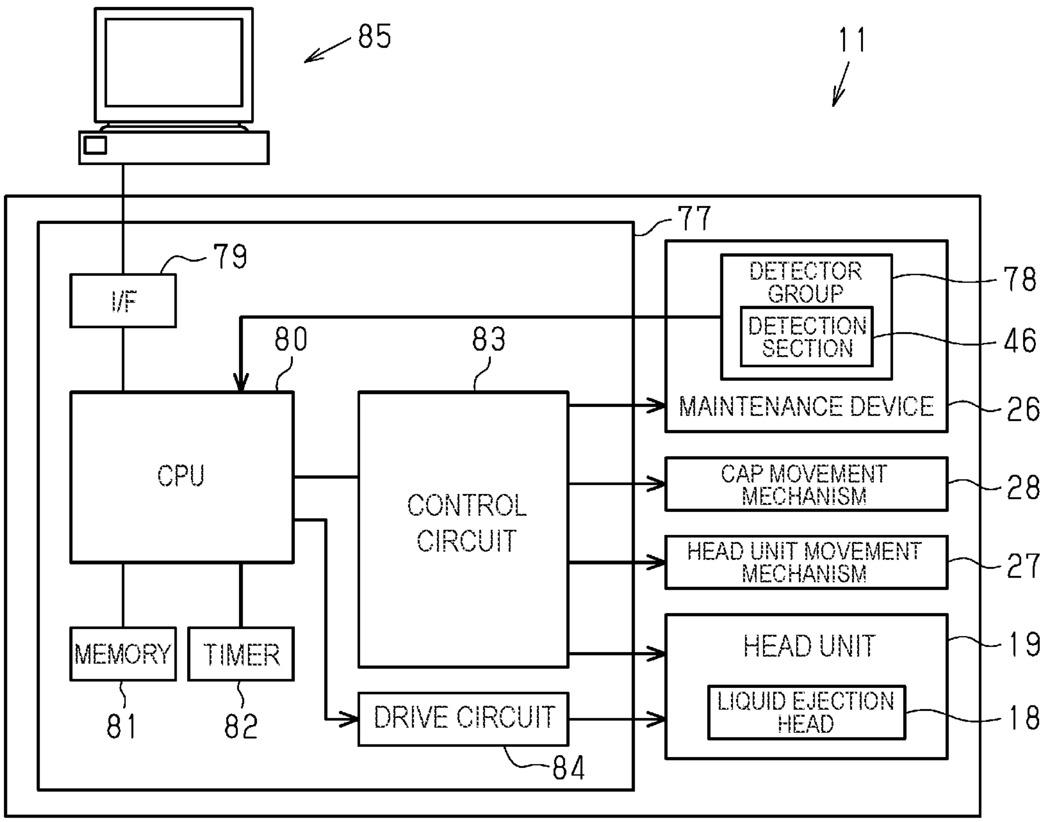
FIG. 4 is a block diagram showing electrical configuration of the liquid ejection apparatus.

As illustrated in FIG. 4, the liquid ejection apparatus 11 includes a controller 77 that controls the head unit 19, the head unit movement mechanism 27, the cap movement mechanism 28, the maintenance device 26, and the like. The maintenance device 26 includes a detector group 78 that outputs a detection signal to the controller 77. The detector group 78 includes the detection section 46, which detects the liquid level of the humidification fluid L1 in the humidification fluid storage section 39. The detection section 46 outputs a detection signal to the controller 77.

The controller 77 includes an interface section 79, a CPU 80, a memory 81, a timer 82 as an example of a measurement section, a control circuit 83, and a drive circuit 84. The interface section 79 transmits and receives various kinds of data and the like between the liquid ejection apparatus 11 and a computer 85, which is an example of an external apparatus. The drive circuit 84 generates a drive signal for driving an actuator of the liquid ejection head 18.

The CPU 80 is a central processing unit. The memory 81 is a storage device that secures area for storing various programs executed by the CPU 80, a work area, or the like, and includes storage elements such as RAM and EEPROM. The memory 81 stores various information, various programs including an installation time agitation process routine, a post installation agitation process routine, and a post printing agitation process routine shown in the flowcharts of FIGS. 5 to 7, and the like. The CPU 80 controls the head unit 19, the head unit movement mechanism 27, the cap movement mechanism 28, the maintenance device 26, and the like via the control circuit 83, in accordance with the programs stored in the memory 81.

The timer 82 measures various times including an unused time, which is the time during which the liquid ejection apparatus 11 is not used. The unused time is, for example, the time from when the power of the liquid ejection apparatus 11 is turned off to when the power of the liquid ejection apparatus 11 is turned on.

Agitation Operation of the Humidification Fluid L1 in the Humidification Fluid Storage Section 39

As shown in FIG. 3, as the first agitation and circulation, the controller 77 causes the moisture supply section 56 to supply the moisture L2 to the circulation path 42 and also drives the second pump 53 to cause the humidification fluid L1 to flow in the circulation path 42. The supply of moisture L2 into the circulation path 42 by the moisture supply section 56 is performed by the controller 77 opening the second open and close valve 59.

In the first agitation and circulation operation, the supply of moisture L2 into the circulation path 42 and the drive of the second pump 53 may be performed at arbitrary timings. That is, in the first agitation and circulation operation, the two operations of the supply of moisture L2 into the circulation path 42 and drive of the second pump 53 may be performed simultaneously, one operation may be performed before the other operation, or one operation and the other operation may be alternately performed at least once.

As the first agitation and circulation, for example, when the second pump 53 is driven in a state where the second open and close valve 59 is open, the humidification fluid L1 in the humidification fluid storage section 39 is sent to the humidification chamber 32 through the supply flow path 40. At this time, the moisture L2 in the moisture storage section 57 flows into the circulation path 42 via the moisture supply flow path 58 and the first merging section 62, and then is sent to the humidification chamber 32 via the supply flow path 40 together with the humidification fluid L1 from the humidification fluid storage section 39.

The humidification fluid L1 sent to the humidification chamber 32 through the supply flow path 40 and the moisture L2 from the moisture storage section 57 are sent into the humidification fluid storage section 39 through the collection flow path 41. At this time, the one end 41*a* of the collection flow path 41 opens at a position in the humidification fluid storage section 39 that is lower than the liquid surface of the humidification fluid L1 in the humidification fluid storage section 39. Therefore, the humidification fluid L1 sent from the humidification chamber 32 through the collection flow path 41 into the humidification fluid storage section 39 and the moisture L2 from the moisture storage section 57 are sent out from the one end 41*a* of the collection flow path 41 into the humidification fluid L1 in the humidification fluid storage section 39.

Thus, since currents in various directions, including a current from below to above, are generated in the humidification fluid L1 in the humidification fluid storage section 39, the humidification fluid L1 in the humidification fluid storage section 39 is efficiently agitated by the currents. Therefore, it is possible to sufficiently mix the humidification fluid L1 that was fed from the one end 41*a* of the collection flow path 41 into the humidification fluid L1 in the humidification fluid storage section 39, and the moisture L2 from the moisture storage section 57, with the humidification fluid L1 in the humidification fluid storage section 39.

The first agitation and circulation may be performed in a state in which the closed space forming section 31 of the cap 22 is in contact with the nozzle surface 25 of the liquid ejection head 18 to form a closed space into which the nozzles 24 open and also in which the fourth open and close valve 76 is closed, that is, in a state in which the inside of the closed space forming section 31 is sealed. The first agitation and circulation may be performed in a state where the inside of the closed space forming section 31 of the cap 22 communicates with the atmosphere.

By separating the closed space forming section 31 from the nozzle surface 25 of the liquid ejection head 18, the inside of the closed space forming section 31 comes into communication with atmosphere. Even when the closed space forming section 31 is in contact with the nozzle surface 25 of the liquid ejection head 18 to form a closed space into which the nozzles 24 open, the inside of the closed space forming section 31 will come into communication with atmosphere by opening the fourth open and close valve 76.

The first agitation and circulation includes a short time first agitation and circulation and a long time first agitation and circulation. The short time first agitation and circulation is an operation of performing the above-described first agitation and circulation for, for example, a first predetermined time (short time) set in advance. The long time first agitation and circulation is an operation of performing the above-described first agitation and circulation for a time (long time) that is longer than the above-described first predetermined time.

As shown in FIG. 3, as the second agitation and circulation, the controller 77 causes the moisture supply section 56 to supply the moisture L2 to the circulation path 42 and also drives the first pump 52 and the second pump 53 to cause the humidification fluid L1 to flow in the circulation path 42. The second agitation and circulation is an operation in which driving of the first pump 52 is added to the operation of the above-described first agitation and circulation. That is, the second agitation and circulation is an operation of performing the above-described first agitation and circulation while driving the first pump 52 in a state where the first open and close valve 51 is opened to reduce the pressure in the humidification fluid storage section 39. The second agitation and circulation is a stronger agitation operation than the first agitation and circulation described above.

In the second agitation and circulation operation, supply of moisture L2 into the circulation path 42, pressure reduction in the humidification fluid storage section 39 by driving the first pump 52, and drive of the second pump 53 may be performed at arbitrary timings. That is, in the second agitation and circulation operation, the three operations of supply of moisture L2 into the circulation path 42, pressure reduction in the humidification fluid storage section 39 by driving the first pump 52, and drive of the second pump 53 may be performed at the timings such as the following. That is, all of the above three operations may be performed at the same time, any two of the operations may be performed at the same time and afterward the remaining one operation may be performed, any one of the operations may be performed and afterward the remaining two operations may be performed at the same time, or the operations may be sequentially performed one by one.

As the second agitation and circulation, for example, the second pump 53 is driven in a state where the second open and close valve 59 is opened and the first pump 52 is driven in a state where the first open and close valve 51 is opened. Then, the interior of the humidification fluid storage section 39 is depressurized, and the humidification fluid L1 in the humidification fluid storage section 39 is sent to the humidification chamber 32 through the supply flow path 40. At this time, the moisture L2 in the moisture storage section 57 flows into the circulation path 42 via the moisture supply flow path 58 and the first merging section 62, and then is sent to the humidification chamber 32 via the supply flow path 40 together with the humidification fluid L1 from the humidification fluid storage section 39.

The humidification fluid L1 sent to the humidification chamber 32 through the supply flow path 40 and the moisture L2 from the moisture storage section 57 are sent into the humidification fluid storage section 39 through the collection flow path 41. At this time, since the interior of the humidification fluid storage section 39 is depressurized by the first pump 52, the pressure in the humidification fluid storage section 39 is lower than the pressure in the humidification chamber 32. Therefore, the humidification fluid L1 in the humidification chamber 32 and the moisture L2 from the moisture storage section 57 are rapidly and smoothly sent into the humidification fluid storage section 39 through the collection flow path 41 by the pressure difference between pressure in the humidification fluid storage section 39 and the pressure in the humidification chamber 32.

Further, at this time, the one end 41*a* of the collection flow path 41 opens at a position lower than the liquid surface of the humidification fluid L1 in the humidification fluid storage section 39. Therefore, the humidification fluid L1 sent from the humidification chamber 32 into the humidification fluid storage section 39 through the collection flow path 41 and the moisture L2 from the moisture storage section 57 are vigorously sent out from the one end 41*a* of the collection flow path 41 into the humidification fluid L1 in the humidification fluid storage section 39.

Accordingly, strong currents in various directions, including a current from the below to upward, are generated in the humidification fluid L1 in the humidification fluid storage section 39, and thus the humidification fluid L1 in the humidification fluid storage section 39 is more efficiently agitated by the currents. Therefore, it is possible to mix the humidification fluid L1 that was fed from the one end 41*a* of the collection flow path 41 into the humidification fluid L1 in the humidification fluid storage section 39, and the moisture L2 from the moisture storage section 57, with the humidification fluid L1 in the humidification fluid storage section 39 in a shorter time.

The second agitation and circulation may be performed in a state in which the closed space forming section 31 of the cap 22 is in contact with the nozzle surface 25 of the liquid ejection head 18 to form a closed space into which the nozzles 24 open, and also in which the fourth open and close valve 76 is closed, that is, in a state in which the inside of the closed space forming section 31 is sealed. The second agitation and circulation may be performed in a state where the inside of the closed space forming section 31 of the cap 22 communicates with the atmosphere.

By separating the closed space forming section 31 from the nozzle surface 25 of the liquid ejection head 18, the inside of the closed space forming section 31 comes into communication with atmosphere. Even when the closed space forming section 31 is in contact with the nozzle surface 25 of the liquid ejection head 18 to form a closed space into which the nozzles 24 open, the inside of the closed space forming section 31 will come into communication with atmosphere by opening the fourth open and close valve 76.

When the second agitation and circulation is performed in a state in which the inside of the closed space forming section 31 of the cap 22 is communication with atmosphere, not only humidification fluid L1 and moisture L2 from the moisture storage section 57 is sent from the humidification chamber 32 into the humidification fluid storage section 39 through the collection flow path 41, but also air via the first moisture permeable membrane 35. That is, not only humidification fluid L1 and moisture L2 from the moisture storage section 57, but also air is sent from the one end 41*a* of the collection flow path 41 into the humidification fluid L1 in the humidification fluid storage section 39.

Then, the air sent from the one end 41*a* of the collection flow path 41 into the humidification fluid L1 in the humidification fluid storage section 39 becomes bubbles and rises toward the liquid surface. Thus, the humidification fluid L1 in the humidification fluid storage section 39 is efficiently and effectively agitated. That is, the humidification fluid L1 in the humidification fluid storage section 39 is efficiently agitated by the air. In other words, as the second agitation and circulation, the controller 77 agitates the humidification fluid L1 in the humidification fluid storage section 39 with air by opening the first open and close valve 51 and driving the first pump 52 in a state in which the inside of the closed space forming section 31 communicates with atmosphere. The second agitation and circulation is performed, for example, only for a second predetermined time set in advance.

A larger agitation effect can be obtained by agitating by feeding air to generate bubbles in the humidification fluid L1 in the humidification fluid storage section 39 than by agitating by feeding humidification fluid L1 and moisture L2 from the moisture storage section 57 in the humidification fluid L1 in the humidification fluid storage section 39. Therefore, it is desirable that the second agitation and circulation be performed in a state where the inside of the closed space forming section 31 communicates with atmosphere. With this configuration, it is possible to mix the humidification fluid L1 that was fed from the one end 41*a* of the collection flow path 41 into the humidification fluid L1 in the humidification fluid storage section 39, and the moisture L2 from the moisture storage section 57, with the humidification fluid L1 in the humidification fluid storage section 39 even more effectively by using air bubbles.

Installation time agitation process routine

Next, the installation time agitation process routine executed by the controller 77 will be described with reference to the flowchart shown in FIG. 5. The installation time agitation process routine is executed at the time of installation when the liquid ejection apparatus 11 shipped from a factory is installed by a user, a service person, or the like, after initial filling of liquid into the liquid ejection head 18 is completed in a state in which the power is turned on. When the liquid ejection apparatus 11 is powered on at installation time, initial filling of the liquid into the liquid ejection head 18 is performed.

When the initial filling of the liquid into the liquid ejection head 18 is completed in the liquid ejection apparatus 11, a flag is turned on. The controller 77 recognizes the installation time of the liquid ejection apparatus 11 by confirming the ON state of the flag that was turned on when the initial filling of the liquid ejection head 18 with liquid was completed. The flag that was turned on when the initial filling of the liquid into the liquid ejection head 18 was completed is turned off when the power supply is turned off after the execution of the installation time agitation process routine.

Figure 5:
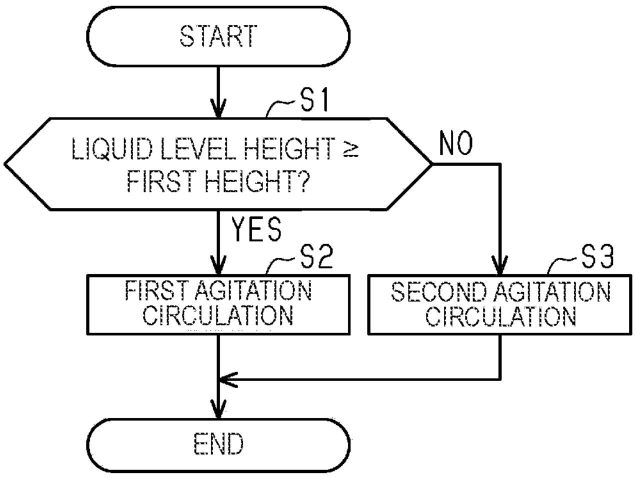
FIG. 5 is a flowchart showing an installation time agitation process routine.

As shown in FIG. 5, when the installation time agitation process routine is executed, first, the controller 77 determines whether or not the height of the liquid surface of the humidification fluid L1 stored in the humidification fluid storage section 39 is equal to or higher than the first height H (step S1). When the determination result of step S1 is an affirmative determination, the controller 77 executes the first agitation and circulation (step S2), and then ends the installation time agitation process routine.

In step S2, either the short time first agitation and circulation or the long time first agitation and circulation may be performed, but it is desirable to perform the long time first agitation and circulation. In a case where the determination result of step S1 is a negative determination, the controller 77 executes the second agitation and circulation (step S3), and then ends the installation time agitation process routine.

Post Installation Agitation Process Routine

Next, the post installation agitation process routine executed by the controller 77 will be described based on the flowchart shown in FIG. 6. The post installation agitation process routine is executed when the power is turned on by the user after the liquid ejection apparatus 11 is installed (after the power was turned off at the installation time). The controller 77 recognizes that the liquid ejection apparatus 11 has been installed by confirming that the flag that is turned on upon completion of the initial filling of the liquid ejection head 18 with the liquid, is in an off state.

Figure 6:
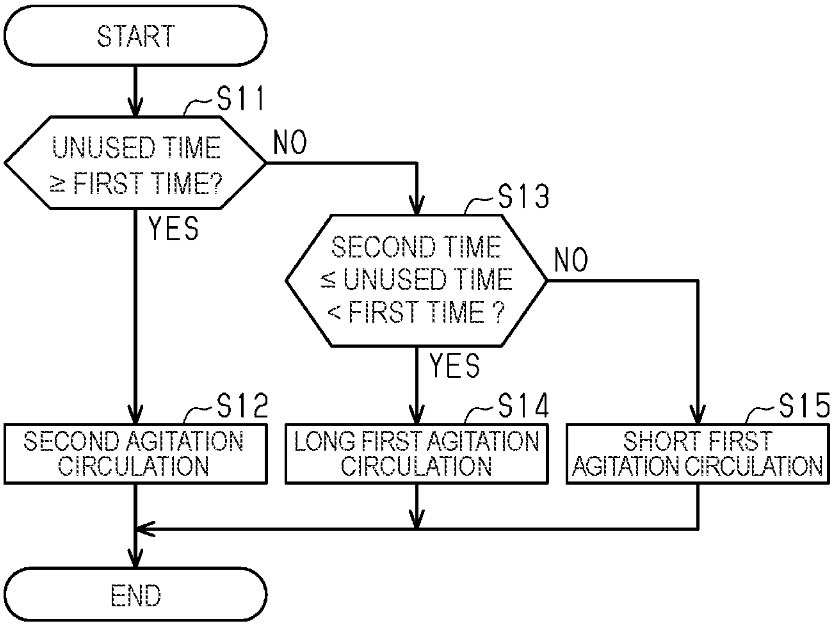
FIG. 6 is a flowchart showing a post installation agitation process routine.

As illustrated in FIG. 6, when the post installation agitation process routine is executed, first, the controller 77 determines whether or not an unused time, which is the time during which the liquid ejection apparatus 11 was not used, is equal to or greater than a first time (step S11). The first time is set to six months, for example. When the determination result of step S11 is an affirmative determination, the controller 77 executes the second agitation and circulation (step S12), and then ends the post installation agitation process routine.

When the determination result of step S11 is a negative determination, the controller 77 determines whether or not the unused time is equal to or longer than a second time and shorter than the first time (step S13). The second time is a time that is shorter than the first time. The second time is set to, for example, one month. When the determination result of step S13 is an affirmative determination, then the controller 77 executes the long time first agitation and circulation (step S14), and then ends the post installation agitation process routine.

When the determination result of step S13 is a negative determination, that is, when the unused time is less than the second time, then the controller 77 executes the short time first agitation and circulation (step S15), and then ends the post installation agitation process routine.

Post Printing Agitation Process Routine

Next, the post printing agitation process routine executed by the controller 77 will be described with reference to the flowchart shown in FIG. 7. The post printing agitation process routine is executed after printing (print job) by the liquid ejection apparatus 11 is completed.

Figure 7:
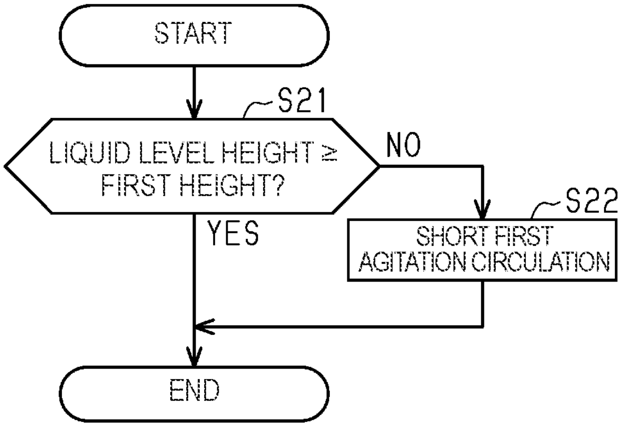
FIG. 7 is a flowchart showing a post printing agitation process routine.

As shown in FIG. 7, when the post printing agitation process routine is executed, first, the controller 77 determines whether or not the height of the liquid surface of the humidification fluid L1 stored in the humidification fluid storage section 39 is equal to or higher than the first height H (step S21). In a case where the determination result of step S21 is an affirmative determination, the controller 77 ends the post printing agitation process routine. When the determination result of step S21 is a negative determination, the controller 77 executes the short time first agitation and circulation (step S22), and then ends the post printing agitation process routine.

Operation of the Liquid Ejection Apparatus 11

At the installation time of the liquid ejection apparatus 11 shipped from a factory, a long time may have elapsed before installation. Therefore, the moisture L2 may have evaporated from the humidification fluid L1 in the humidification fluid storage section 39, and the concentration of the moisturizing agent in the humidification fluid L1 may have increased. In particular, when the height of the liquid surface of the humidification fluid L1 in the humidification fluid storage section 39 is less than the first height H at the installation time of the liquid ejection apparatus 11, that means that a large amount of moisture L2 has evaporated from the humidification fluid L1 in the humidification fluid storage section 39.

This is because the humidification fluid storage section 39 of the liquid ejection apparatus 11 when manufactured at the factory accommodates the humidification fluid L1 supplied to the circulation path 42 and to the humidification chamber 32 in addition to the humidification fluid L1 stored in the humidification fluid storage section 39. When a large amount of moisture L2 evaporates from the humidification fluid L1 in the humidification fluid storage section 39 and the concentration of the moisturizing agent in the humidification fluid L1 increases, then even if the moisture L2 is supplied, the supplied moisture L2 and moisturizing agent are difficult to mix.

In this regard, in the liquid ejection apparatus 11 according to the embodiment, the one end 41*a* of the collection flow path 41 in the circulation path 42 is configured to open at a position in the humidification fluid storage section 39 that is lower than the liquid surface of the humidification fluid L1 in the humidification fluid storage section 39. In addition, when the height of the liquid surface of the humidification fluid L1 in the humidification fluid storage section 39 is equal to or higher than the first height H at the installation time of the liquid ejection apparatus 11, then the first agitation and circulation (the long time first agitation and circulation or the short time first agitation and circulation) is performed. On the other hand, when the height of the liquid surface of the humidification fluid L1 in the humidification fluid storage section 39 is less than the first height H at installation time of the liquid ejection apparatus 11, then the second agitation and circulation, which is a stronger agitation operation than the first agitation and circulation, is performed.

After the liquid ejection apparatus 11 is installed, normally, as the unused time of the liquid ejection apparatus 11 becomes longer, the evaporation amount of the moisture L2 from the humidification fluid L1 in the humidification fluid storage section 39 becomes larger. Therefore, when, after the installation of the liquid ejection apparatus 11, the unused time of the liquid ejection apparatus 11 is equal to or longer than the first time, then the second agitation and circulation is performed.

After the liquid ejection apparatus 11 is installed, in a case where the unused time of the liquid ejection apparatus 11 is equal to or longer than the second time and less than the first time, then the long time first agitation and circulation, which is an agitation operation weaker than the second agitation and circulation, is performed. After installation of the liquid ejection apparatus 11, in a case where the unused time of the liquid ejection apparatus 11 is less than the second time, then the short time first agitation and circulation, which is an agitation operation weaker than the long time first agitation and circulation, is performed.

Further, after installation of the liquid ejection apparatus 11, when the height of the liquid surface of the humidification fluid L1 in the humidification fluid storage section 39 is less than the first height H after printing (print job) is completed, then the short time first agitation and circulation is performed.

In this manner, in the liquid ejection apparatus 11 of the present embodiment, an appropriate agitation operation is performed in accordance with the degree of lowering of the liquid surface of the humidification fluid L1 in the humidification fluid storage section 39 due to evaporation of the moisture L2. In this case, the humidification fluid L1 flowing through the collection flow path 41, the moisture L2 from the moisture storage section 57, and air will be delivered from the one end 41*a* of the collection flow path 41 into the humidification fluid L1 in the humidification fluid storage section 39, regardless of which agitation operation, from amongst the first agitation and circulation (the long time first agitation and circulation and the short time first agitation and circulation) or the second agitation and circulation, is performed.

Therefore, regardless of the amount of evaporation of the moisture L2 in the humidification fluid L1 in the humidification fluid storage section 39, the inside of the humidification fluid storage section 39 will be efficiently agitated while the moisture L2 is supplied to the humidification fluid L1 in the humidification fluid storage section 39. Therefore, the humidification fluid L1 in the humidification fluid storage section 39 and the moisture L2 supplied into the humidification fluid storage section 39 are sufficiently and effectively mixed.

Effects of Present Embodiment

According to the embodiment described above in detail, the following effects are exhibited.

(1) In the liquid ejection apparatus 11, one end 41*a* of the collection flow path 41 opens at a position in the humidification fluid storage section 39 that is lower than the liquid surface of the humidification fluid L1 in the humidification fluid storage section 39. As the first agitation and circulation, the controller 77 causes the moisture supply section 56 to supply the moisture L2 to the circulation path 42 and also drives the second pump 53 to cause the humidification fluid L1 to flow in the circulation path 42.

According to this configuration, by performing the first agitation and circulation, the humidification fluid L1 and the moisture L2 supplied from the moisture supply section 56 can be efficiently agitated, even if the moisture L2 in the humidification fluid L1 has evaporated. Therefore, the humidification fluid L1 and the moisture L2 supplied from the moisture supply section 56 can be sufficiently mixed.

(2) The liquid ejection apparatus 11 includes the first pump 52, which is capable of reducing pressure in the space in the humidification fluid storage section 39. As the second agitation and circulation, the controller 77 causes the moisture supply section 56 to supply the moisture L2 to the circulation path 42 and also drives the second pump 53 and the first pump 52 to cause the humidification fluid L1 to flow in the circulation path 42.

According to this configuration, by performing the second agitation and circulation, the humidification fluid L1 and the moisture L2 supplied from the moisture supply section 56 can be agitated in a short time. That is, it is possible to shorten the agitation time required for mixing the humidification fluid L1 and the moisture L2 supplied from the moisture supply section 56.

(3) In the liquid ejection apparatus 11, as the second agitation and circulation, the controller 77 agitates inside the humidification fluid storage section 39 with air by driving the first pump 52 in a state in which the inside of the closed space forming section 31 communicates with atmosphere.

According to this configuration, it is possible to efficiently agitate the inside of the humidification fluid storage section 39 by the bubbles of air.

(4) The liquid ejection apparatus 11 includes the detection section 46, which is capable of detecting the height of the liquid surface in the humidification fluid storage section 39. The controller 77 performs the first agitation and circulation when the height of the liquid surface is equal to or higher than the first height H at installation time of the liquid ejection apparatus 11, and performs the second agitation and circulation when the height of the liquid surface is lower than the first height H at installation time of the liquid ejection apparatus 11.

According to this configuration, an appropriate agitation operation can be performed in accordance with the degree of lowering of the liquid surface in the humidification fluid storage section 39 due to evaporation of the moisture L2.

(5) The liquid ejection apparatus 11 includes the timer 82 that measures an unused time, which is a time during which the liquid ejection apparatus 11 is not used. After the liquid ejection apparatus 11 is installed, the controller 77 performs the second agitation and circulation when the unused time is equal to or longer than the first time, performs the long time first agitation and circulation, which has a long agitation time, when the unused time is equal to or longer than the second time and shorter than the first time, and performs the short time first agitation and circulation, which has a short agitation time, when the unused time is shorter than the second time.

According to this configuration, it is possible to perform an appropriate agitation operation in accordance with the duration of the unused time of the liquid ejection apparatus 11, which is related to the evaporation amount of the moisture L2.

Modifications

The above-described embodiment can be modified as follows. The present embodiment and the following modifications can be implemented in combination with each other within a range where there is no technical contradiction.

The timer 82 may be omitted.

The detection section 46 may be omitted.

The maintenance device 26 may be provided in a liquid ejection apparatus that ejects liquid from the liquid ejection head 18 toward the medium M in the vertical direction.

The maintenance device 26 may be provided in a liquid ejection apparatus that is a serial type ink jet printer in which printing is performed by ejecting liquid toward the medium M from a liquid ejection head supported by a carriage that reciprocates in the width direction X.

In the maintenance device 26, the moisture supply section 56 may be disposed in the collection flow path 41. In this case, the second pump 53 may also be disposed in the collection flow path 41.

The maintenance device 26 may be configured so that the moisture L2 in the moisture storage section 57 can be replenished.

- The maintenance device 26 may be configured such that the humidification fluid storage section 39 can be replaced.
- In the liquid ejection apparatus 11, the short time first agitation and circulation may be performed periodically, such as once daily or once every two days, or may be performed irregularly, regardless of the height of the liquid surface in the humidification fluid storage section 39 or the unused time of the liquid ejection apparatus 11.
- The liquid ejection apparatus 11 may be a liquid ejection apparatus that ejects or dispenses liquid other than ink. The state of the liquid ejected from the liquid ejection apparatus in the form of minute droplets includes a granular state, a teardrop state, and a thread-like state with a tail. Here, the liquid may be any material that can be ejected from the liquid ejection apparatus. For example, the liquid can be any substance when in its liquid phase, and includes a fluid body such as a liquid body having high or low viscosity, sol, gel water, other inorganic solvents, organic solvents, solutions, liquid resins, liquid metals, and metal melts. The liquid includes not only liquid that is the only state of the substance, but also a substance in which particles of a functional material composed of a solid such as a pigment or metal particles are dissolved, dispersed, or mixed in a solvent. Typical examples of the liquid include ink as described in the above embodiments, liquid crystal, and the like. Here, the ink includes general water-based ink and oil-based ink, and various liquid compositions such as gel ink and hot-melt ink. Specific examples of the liquid ejection apparatus are apparatuses that eject a liquid containing a material, such as a color material or an electrode material in a dispersed or dissolved form, wherein the material is used for manufacturing a liquid crystal display, an electroluminescence display, a surface emitting display, a color filter, or the like. The liquid ejection apparatus may be an apparatus that ejects a bioorganic substance used for manufacturing biochips, an apparatus used as a precision pipette for ejecting a liquid serving as a sample, a textile printer, a micro dispenser, or the like. The liquid ejection apparatus may be an apparatus that ejects a lubricating oil to a precision machine such as a watch or a camera in a pinpoint manner, or an apparatus that ejects a transparent resin liquid, such as an ultraviolet curable resin, onto a substrate in order to form a micro-hemispherical lens, an optical lens, or the like that is used in an optical communication element or the like. The liquid ejection apparatus may be an apparatus that ejects an etching liquid such as an acid or an alkali in order to etch a substrate or the like.

Hereinafter, technical ideas grasped from the above-described embodiment and modified examples, and operation and effects thereof, will be described.

(A) A liquid ejection apparatus includes a liquid ejection head configured to eject liquid from a nozzle; a cap including a closed space forming section configured to form a closed space, in which the nozzle opens, by coming into contact with the liquid ejection head, an inflow port through which a humidification fluid for humidifying the closed space flows in, and an outflow port through which the humidification fluid flows out; a humidification fluid storage section configured to store the humidification fluid; a supply flow path configured to bring the humidification fluid storage section and the inflow port into communication; a collection flow path configured to bring the humidification fluid storage section and the outflow port into communication; a pump configured to cause the humidification fluid to flow in a circulation path including the humidification fluid storage section, the supply flow path, and the collection flow path; a water supply section configured to supply water into the circulation path; and a controller, wherein one end of the collection flow path opens at a position in the humidification fluid storage section that is lower than a liquid surface of the humidification fluid in the humidification fluid storage section and, as a first agitation and circulation, the controller supplies water from the water supply section into the circulation path and drives the pump to cause the humidification fluid to flow in the circulation path.

According to this configuration, by performing the first agitation and circulation, the humidification fluid and the water supplied from the water supply section can be efficiently agitated, even if the moisture in the humidification fluid has evaporated. Therefore, the humidification fluid and the water supplied from the water supply section can be sufficiently mixed.

(B) The liquid ejection apparatus may further include a pressure reducing section configured to reduce pressure in a space in the humidification fluid storage section, wherein, as a second agitation and circulation, the controller may supply water from the water supply section to the circulation path and drives the pump and the pressure reducing section to cause the humidification fluid to flow in the circulation path.

According to this configuration, by performing the second agitation and circulation, the humidification fluid and the water supplied from the water supply section can be agitated in a short time. That is, it is possible to shorten the agitation time needed to mix the humidification fluid and the water supplied from the water supply section.

(C) The liquid ejection apparatus may be such that as the second agitation and circulation, the controller agitates the inside of the humidification fluid storage section with air by driving the pressure reducing section in a state in which the inside of the closed space forming section communicates with atmosphere.

According to this configuration, it is possible to efficiently agitate the inside of the humidification fluid storage section by the bubbles of air.

(D) The liquid ejection apparatus may further include a detection section configured to detect height of the liquid surface in the humidification fluid storage section, wherein at installation time of the liquid ejection apparatus, the controller may perform the first agitation and circulation when the height of the liquid surface is equal to or higher than a first height and performs the second agitation and circulation when the height of the liquid surface is lower than the first height.

According to this configuration, it is possible to perform an appropriate agitation operation in accordance with the degree of lowering of the liquid surface in the humidification fluid storage section due to evaporation.

(E) The liquid ejection apparatus may be configured to further include a measurement section configured to measure an unused time during which the liquid ejection apparatus is not used, wherein after the liquid ejection apparatus is installed, the controller performs the second agitation and circulation when the unused time is equal to or longer than a first time, performs the first agitation and circulation having a long agitation time when the unused time is equal to or longer than a second time and shorter than the first time, and performs the first agitation and circulation having a short agitation time when the unused time is shorter than the second time.

According to this configuration, it is possible to perform an appropriate agitation operation in accordance with the length of the unused time of the liquid ejection apparatus related to evaporation.

(F) An agitation method for a liquid ejection apparatus, the liquid ejection apparatus including a liquid ejection head configured to eject liquid from a nozzle; a cap including a closed space forming section configured to form a closed space, in which the nozzle opens, by coming into contact with the liquid ejection head, an inflow port through which a humidification fluid for humidifying the closed space flows in, and an outflow port through which the humidification fluid flows out; a humidification fluid storage section configured to store the humidification fluid; a supply flow path configured to bring the humidification fluid storage section and the inflow port into communication; a collection flow path configured to bring the humidification fluid storage section and the outflow port into communication; a pump configured to cause the humidification fluid to flow in a circulation path including the humidification fluid storage section, the supply flow path, and the collection flow path; and a water supply section configured to supply water into the circulation path, the agitation method including opening one end of the collection flow path at a position in the humidification fluid storage section lower than a liquid surface of the humidification fluid in the humidification fluid storage section and performing a first agitation and circulation of supplying water from the water supply section into the circulation path and driving the pump to cause the humidification fluid to flow in the circulation path.

According to this configuration, by performing the first agitation and circulation, the humidification fluid and the water supplied from the water supply section can be efficiently agitated, even if the moisture in the humidification fluid has evaporated. Therefore, the humidification fluid and the water supplied from the water supply section can be sufficiently mixed.

(G) In the agitation method of the liquid ejection apparatus, the liquid ejection apparatus may include a pressure reducing section configured to reduce pressure in a space in the humidification fluid storage section, and the method may include performing a second agitation and circulation of supplying water from the water supply section into the circulation path and driving the pump and the pressure reducing section to cause the humidification fluid to flow in the circulation path.

According to this configuration, by performing the second agitation and circulation, the humidification fluid and the water supplied from the water supply section can be agitated in a short time. That is, it is possible to shorten the agitation time needed to mix the humidification fluid and the water supplied from the water supply section.

(H) The agitation method of the liquid ejection apparatus may be such that the second agitation and circulation includes agitating the inside of the humidification fluid storage section with air by driving the pressure reducing section in a state in which the inside of the closed space forming section communicates with atmosphere.

According to this configuration, it is possible to efficiently agitate the inside of the humidification fluid storage section by the bubbles of air.

(I) In the agitation method of the liquid ejection apparatus, the liquid ejection apparatus may include a detection section configured to detect height of the liquid surface in the humidification fluid storage section, and the method may include at installation time of the liquid ejection apparatus, performing the first agitation and circulation when the height of the liquid surface is equal to or higher than a first height and performing the second agitation and circulation when the height of the liquid surface is lower than the first height.

According to this configuration, it is possible to perform an appropriate agitation operation in accordance with the degree of lowering of the liquid surface in the humidification fluid storage section due to evaporation.

(J) In the agitation method of the liquid ejection apparatus, the liquid ejection apparatus may include a measurement section configured to measure an unused time during which the liquid ejection apparatus is not used, and the method may include, after the liquid ejection apparatus is installed, performing the second agitation and circulation when the unused time is equal to or longer than a first time, performing the first agitation and circulation having a long agitation time when the unused time is equal to or longer than a second time and shorter than the first time, and performing the first agitation and circulation having a short agitation time when the unused time is shorter than the second time.

According to this configuration, it is possible to perform an appropriate agitation operation in accordance with the length of the unused time of the liquid ejection apparatus related to evaporation.

What is claimed is:

1. A liquid ejection apparatus, comprising:

a liquid ejection head configured to eject liquid from a nozzle;

a cap including a closed space forming section configured to form a closed space, in which the nozzle opens, by coming into contact with the liquid ejection head, an inflow port through which a humidification fluid for humidifying the closed space flows in, and an outflow port through which the humidification fluid flows out;

a humidification fluid storage section configured to store the humidification fluid;

a supply flow path configured to bring the humidification fluid storage section and the inflow port into communication;

a collection flow path configured to bring the humidification fluid storage section and the outflow port into communication;

a pump configured to cause the humidification fluid to flow in a circulation path including the humidification fluid storage section, the supply flow path, and the collection flow path;

a water supply section configured to supply water into the circulation path; and a controller, wherein one end of the collection flow path opens at a position in the humidification fluid storage section that is lower than a liquid surface of the humidification fluid in the humidification fluid storage section and, as a first agitation and circulation, the controller supplies water from the water supply section into the circulation path and drives the pump to cause the humidification fluid to flow in the circulation path.

2. The liquid ejection apparatus according to claim 1, further comprising:

a pressure reducing section configured to reduce pressure in a space in the humidification fluid storage section, wherein as a second agitation and circulation, the controller supplies water from the water supply section to the circulation path and drives the pump and the pressure reducing section to cause the humidification fluid to flow in the circulation path.

3. The liquid ejection apparatus according to claim 2, wherein as the second agitation and circulation, the controller agitates the inside of the humidification fluid storage section with air by driving the pressure reducing section in a state in which the inside of the closed space forming section communicates with atmosphere.

4. The liquid ejection apparatus according to claim 3, further comprising:

a detection section configured to detect height of the liquid surface in the humidification fluid storage section, wherein at installation time of the liquid ejection apparatus, the controller performs the first agitation and circulation when the height of the liquid surface is equal to or higher than a first height and performs the second agitation and circulation when the height of the liquid surface is lower than the first height.

5. The liquid ejection apparatus according to claim 3, further comprising:

a measurement section configured to measure an unused time during which the liquid ejection apparatus is not used, wherein after the liquid ejection apparatus is installed, the controller performs the second agitation and circulation when the unused time is equal to or longer than a first time, performs the first agitation and circulation having a long agitation time when the unused time is equal to or longer than a second time and shorter than the first time, and performs the first agitation and circulation having a short agitation time when the unused time is shorter than the second time.

6. An agitation method for a liquid ejection apparatus, the liquid ejection apparatus including a liquid ejection head configured to eject liquid from a nozzle;

a cap including a closed space forming section configured to form a closed space, in which the nozzle opens, by coming into contact with the liquid ejection head, an inflow port through which a humidification fluid for humidifying the closed space flows in, and an outflow port through which the humidification fluid flows out;

a humidification fluid storage section configured to store the humidification fluid;

a supply flow path configured to bring the humidification fluid storage section and the inflow port into communication;

a collection flow path configured to bring the humidification fluid storage section and the outflow port into communication;

a pump configured to cause the humidification fluid to flow in a circulation path including the humidification fluid storage section, the supply flow path, and the collection flow path; and a water supply section configured to supply water into the circulation path, the agitation method comprising:

opening one end of the collection flow path at a position in the humidification fluid storage section lower than a liquid surface of the humidification fluid in the humidification fluid storage section and performing a first agitation and circulation of supplying water from the water supply section into the circulation path and driving the pump to cause the humidification fluid to flow in the circulation path.

7. An agitation method according to claim 6, the liquid ejection apparatus further including a pressure reducing section configured to reduce pressure in a space in the humidification fluid storage section, the method further comprising:

performing a second agitation and circulation of supplying water from the water supply section into the circulation path and driving the pump and the pressure reducing section to cause the humidification fluid to flow in the circulation path.

8. The agitation method for a liquid ejection apparatus according to claim 7, wherein the second agitation and circulation includes agitating the inside of the humidification fluid storage section with air by driving the pressure reducing section in a state in which the inside of the closed space forming section communicates with atmosphere.

9. The agitation method for a liquid ejection apparatus according to claim 8, the liquid ejection apparatus further including a detection section configured to detect height of the liquid surface in the humidification fluid storage section, the method further comprising:

at installation time of the liquid ejection apparatus, performing the first agitation and circulation when the height of the liquid surface is equal to or higher than a first height and performing the second agitation and circulation when the height of the liquid surface is lower than the first height.

10. The agitation method for the liquid ejection apparatus according to claim 8, the liquid ejection apparatus further including a measurement section configured to measure an unused time during which the liquid ejection apparatus is not used, the method further comprising:

after the liquid ejection apparatus is installed, performing the second agitation and circulation when the unused time is equal to or longer than a first time, performing the first agitation and circulation having a long agitation time when the unused time is equal to or longer than a second time and shorter than the first time, and performing the first agitation and circulation having a short agitation time when the unused time is shorter than the second time.

* * * * *